United States Patent
Kirby et al.

(10) Patent No.: US 8,286,536 B2
(45) Date of Patent: Oct. 16, 2012

(54) MILLING CUTTER MANUFACTURING METHOD

(75) Inventors: Mark Kirby, Sheffield (GB); Christopher P R Hill, Wotton Under Edge (GB)

(73) Assignee: Rolls-Royce PLC, London (GB)

( * ) Notice: Subject to any disclaimer, the term of this patent is extended or adjusted under 35 U.S.C. 154(b) by 62 days.

(21) Appl. No.: 12/448,696

(22) PCT Filed: Nov. 12, 2007

(86) PCT No.: PCT/GB2007/004308
§ 371 (c)(1), (2), (4) Date: Jul. 23, 2009

(87) PCT Pub. No.: WO2008/090301
PCT Pub. Date: Jul. 31, 2008

(65) Prior Publication Data
US 2009/0324347 A1    Dec. 31, 2009

(30) Foreign Application Priority Data
Jan. 23, 2007  (GB) ................................. 0701242.0

(51) Int. Cl.
*B23B 1/00* (2006.01)
*B23C 5/00* (2006.01)

(52) U.S. Cl. .......................................... 82/1.11; 407/59

(58) Field of Classification Search .................... 407/59, 407/60, 61, 63, 53, 54, 56
See application file for complete search history.

(56) References Cited

U.S. PATENT DOCUMENTS

| | | | |
|---|---|---|---|
| 5,281,060 A * | 1/1994 | Strange et al. ................ | 408/204 |
| 6,719,501 B2 * | 4/2004 | Sekiguchi et al. .............. | 407/63 |
| 6,991,409 B2 * | 1/2006 | Noland ........................... | 407/63 |
| 7,588,396 B2 * | 9/2009 | Flynn .............................. | 407/54 |
| 7,789,597 B2 * | 9/2010 | Wells et al. .................... | 407/53 |
| 2006/0045639 A1 | 3/2006 | Flynn et al. | |

FOREIGN PATENT DOCUMENTS

CH          628 832 A5    3/1982
(Continued)

OTHER PUBLICATIONS

Helle, H. J.; "Neue Technik zum Schleifen von Gesenkfrasern;" *Werkstattstechnik, Springer Verlag*; Mar. 1, 1989; pp. 153-157; vol. 79, No. 3; Berlin, Germany.

*Primary Examiner* — Will Fridie, Jr.
(74) *Attorney, Agent, or Firm* — Oliff & Berridge, PLC

(57) ABSTRACT

A method of manufacturing a milling cutter having a cutting head and a coaxial integral shank including grinding, in a first grinding operation, a plurality of helical flutes into the outer periphery of a cutter blank from a lead end using a peripheral area of a first grinding wheel generally of frusto-conical profile and rotatable about an axis generally transversely of the milling cutter axis, which peripheral area produces, simultaneously, the following three features: a leading face of a trailing tooth; a rear face on an adjacent preceding tooth; and a swarf removal gullet having divergent sides, grinding, in a second grinding operation, and using a peripheral edge of a second grinding wheel, a relief face, which extends rearwardly from a leading end of a tooth tip, resulting in a minimum tooth wedge angle of approximately 60°, and grinding, in a third grinding operation, a radius on the end of each flute.

21 Claims, 12 Drawing Sheets

FOREIGN PATENT DOCUMENTS

| | | |
|---|---|---|
| DE | 10 2005 002 698 A1 | 7/1984 |
| DE | 10 2005 002 698 A1 | 7/2006 |
| EP | 1 125 667 A2 | 8/2001 |
| EP | 1 153 685 A1 | 11/2001 |
| JP | A-59-232711 | 12/1984 |
| JP | A-9-136209 | 5/1997 |
| WO | WO 2006/014711 A1 | 2/2006 |

* cited by examiner

MILLING CUTTER MANUFACTURING METHOD

BACKGROUND

This invention relates to a method of manufacturing a milling cutter for the milling of so-called exotic materials such as titanium alloys, stainless steel, nimonic alloys etc, which are notoriously difficult to machine, and to a milling cutter per se.

The aerospace industry makes extensive use of titanium alloys etc, and, in common with other industries, continually seek to reduce costs of manufacture through either outsourcing to cheaper economies or increasing production.

Materials such as titanium, stainless and nimonic alloys are at the outer boundaries of milling capability and challenge current capabilities to improve productivity. Whilst grinding processes have been developed that have significantly improved productivity even in exotic materials, there are inevitably in some components features that are inaccessible to grinding wheels and hence cannot be shaped by grinding and which therefore still have to be machined.

In other, light duty, spheres of metal processing, fine tooth pitched cutters are known but are predominantly used for deburring applications, such cutters usually being disposable. These are generally open toleranced tools, the tooth style for a burr being a single ratchet tooth form. Although this produces an inherently weak tooth form (having a wedge angle of approximately 50°), it is of little consequence in deburring operations, but these generally very fine pitched cutters will not stand up to the rigours of machining operations such as milling, particularly of exotic material, with the capability and consistency demanded, nor lend themselves to re-sharpening for repeated use. Whilst it is well known that metal removal rate increases with the number of teeth on a cutter, there are of course limitations of how many teeth can be produced in a given cutting tool diameter as well as sharpening those teeth using conventional grinding techniques.

SUMMARY

A basic object of the present invention seeks to provide an improved method of manufacturing a milling cutter, and to an improved milling cutter.

According to a first aspect of the invention, there is provided a method of manufacturing a milling cutter having a cutting head and a coaxial integral shank for mounting a chuck or arbour of a machine tool, including:
(i) grinding, in a first grinding operation, a plurality of helical flutes into the outer periphery of a cutter blank from a lead end of the blank distal from the shank towards the shank, using a peripheral area of a first grinding wheel generally of frusto-conical profile and rotatable about an axis generally transversely of the milling cutter axis, which peripheral area produces, simultaneously, the following three features:—
   a leading face of a trailing tooth;
   a rear face on an adjacent preceding tooth; and
   a swarf removal gullet, of profile corresponding to that of the peripheral area of the first grinding wheel, having divergent sides defined between the leading face of a trailing tooth and the rear face of an adjacent preceding tooth;
(ii) grinding, in a second grinding operation, and using a peripheral edge of a second grinding wheel of rectangular profile, and rotatable about an axis generally transversely of the milling cutter axis, a relief face which extends rearwardly from a leading end of a tooth tip, resulting in a minimum tooth wedge angle of approximately 60° measured between the leading face of a tooth to the relief face of that tooth; and
(iii) grinding, in a third grinding operation, and using a peripheral edge of a third grinding wheel, a radius on the end of each tooth by grinding along each tooth from the lead end of each tooth towards the shank of the cutter.

According to a second aspect of the invention, of independent significance, there is provided a milling cutter including a shank and a cutting head, the cutting head having a plurality of <500 helical teeth at equal angles, with a lead end of each tooth provided with a radius, with each tooth having a minimum tooth wedge angle of approximately 60° measured between the leading face of a tooth and a relief rake face of that tooth.

The resulting radiussed, and relieved multi-tooth, multi-flute form of the milling cutter manufactured in accordance with the first aspect of the invention produces a substantially stronger tooth than that of for example the prior art deburring tool, and has been found, in comparison to conventional milling cutters, in milling identical exotic materials, to improve cutting capability by a significant factor, resulting in lower manufacturing costs for components and a reduced machine tool investment requirement, and is equally useable for both roughing and finishing.

The relief face produced by the secondary grinding operation, comprises a primary relief rake facet and a secondary relief rake facet, which extends from an end of the primary relief rake facet distal from the tooth tip, resulting in a radiussed, double ratchet tooth style allowing optimisation of critical features.

The departure from conventional grinding techniques to the first aspect/method permits the ready formation of the radiussed, double ratchet tooth embodiment, whereas conventional radius grinding of one tooth would wipe out the succeeding tooth, thus limiting the scope of increasing the number of teeth.

The primary and secondary facets are planar, the primary relief rake facet being ground at a first angle, and the secondary relief rake facet being ground at a second angle greater than the first.

The relief face produced by the second grinding operation is of eccentric or convex profile, resulting in increased strength compared with a planar profile.

Each tooth has a double ratchet tooth form including a primary relief rake facet and a contiguous secondary relief rake facet.

The primary and secondary facets are planar, the primary relief rake facet being ground at a first angle, and the secondary relief rake facet being ground at a second angle greater than the first.

The primary relief rake facet has a clearance angle of approximately 5° to 7°.

The secondary relief rake facet has a clearance angle of approximately 10° to 15°.

Each tooth has a relief rake face of eccentric or convex profile, providing increased strength compared with a planar profile.

The leading face of each tooth has a positive radial rake.

The finished milling cutter has <60 teeth. For example, a 16 mm diameter milling cutter has 8-20 teeth with a 1 mm radius, but clearly the maximum number of teeth that it is possible to produce is dependent upon the required milling cutter diameter.

The wedge angle of each tooth is preferably greater than approximately 60° but less than approximately 90°.

In the double ratchet embodiment, the wedge angle of each tooth is approximately 90° less the primary relief rake angle, and less the secondary relief rake angle.

The wedge angle of each tooth is approximately 76°.

BRIEF DESCRIPTION OF THE DRAWINGS

The two aspects of the present invention will now be described by way of examples only with reference to the accompanying drawings, in which.

DETAILED DESCRIPTION OF EMBODIMENTS

Figure 6:
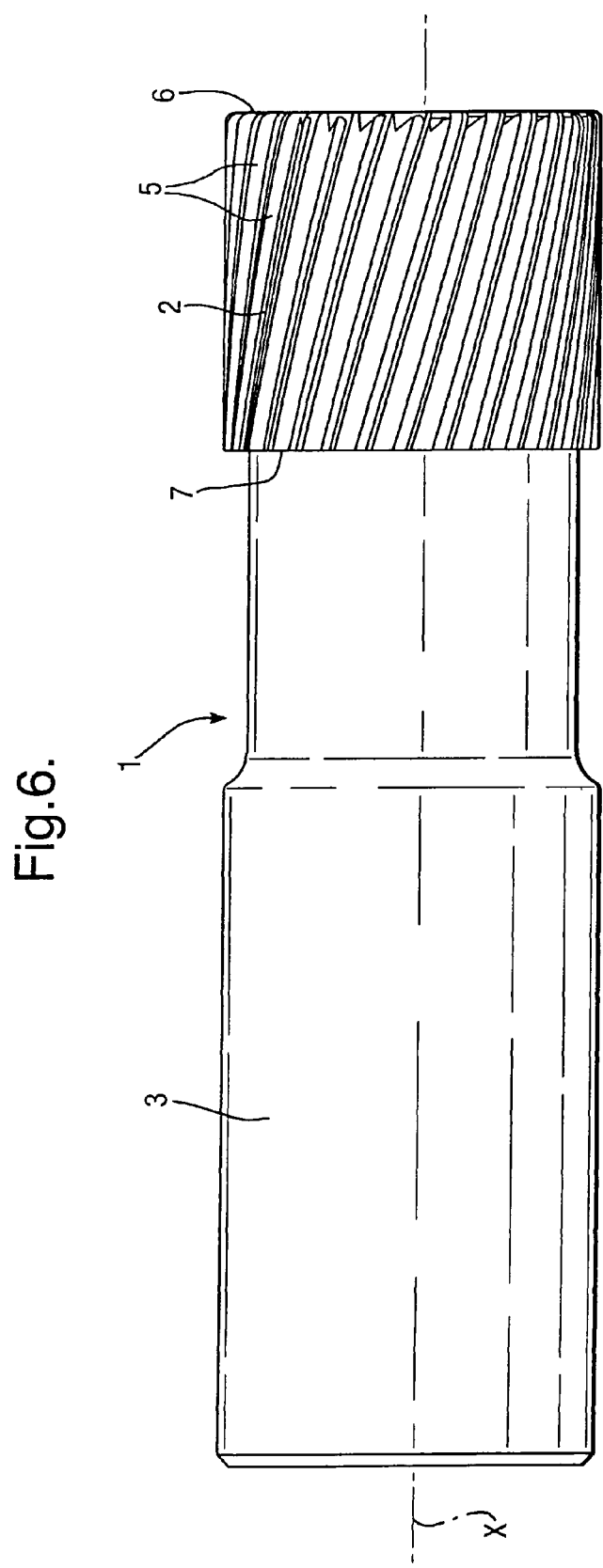
FIG. 6 is a side elevation of a finished milling cutter in accordance with the first embodiment.
Figure 7:
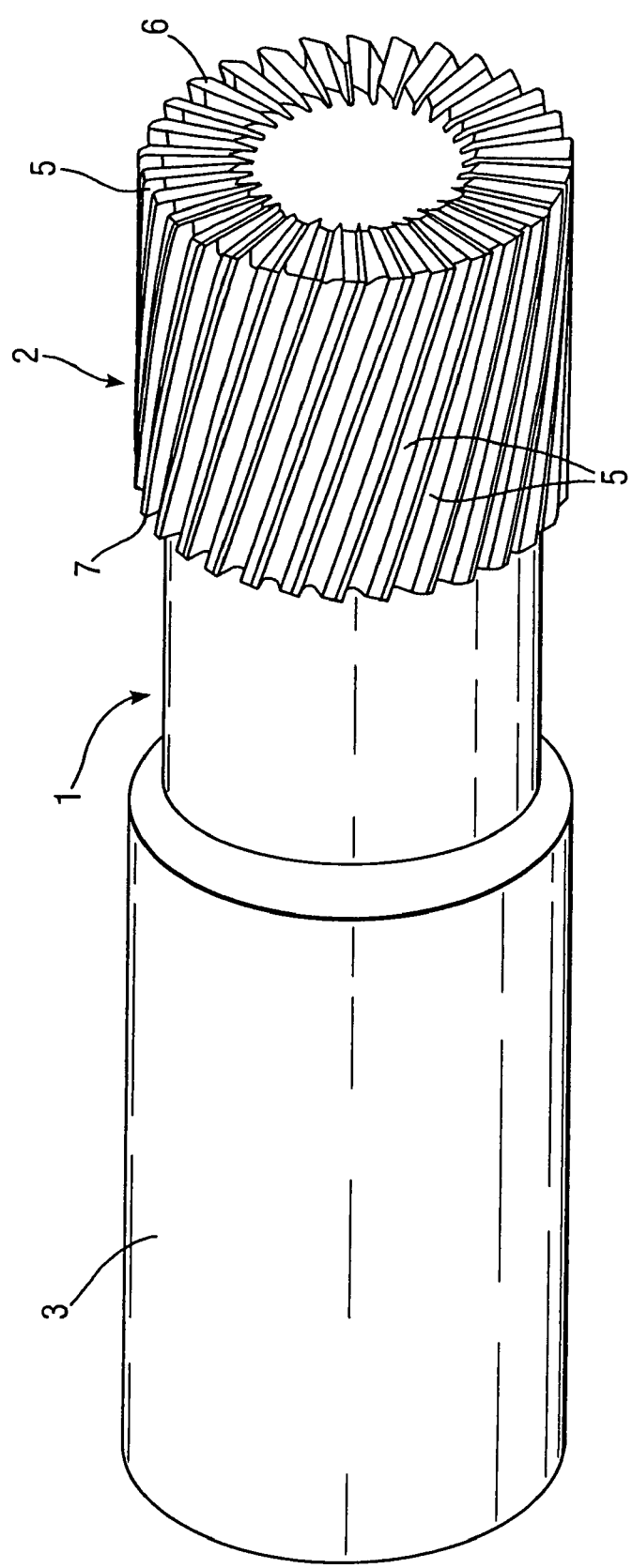
FIG. 7 is an isometric view of the cutter of FIG. 10.
Figure 8:
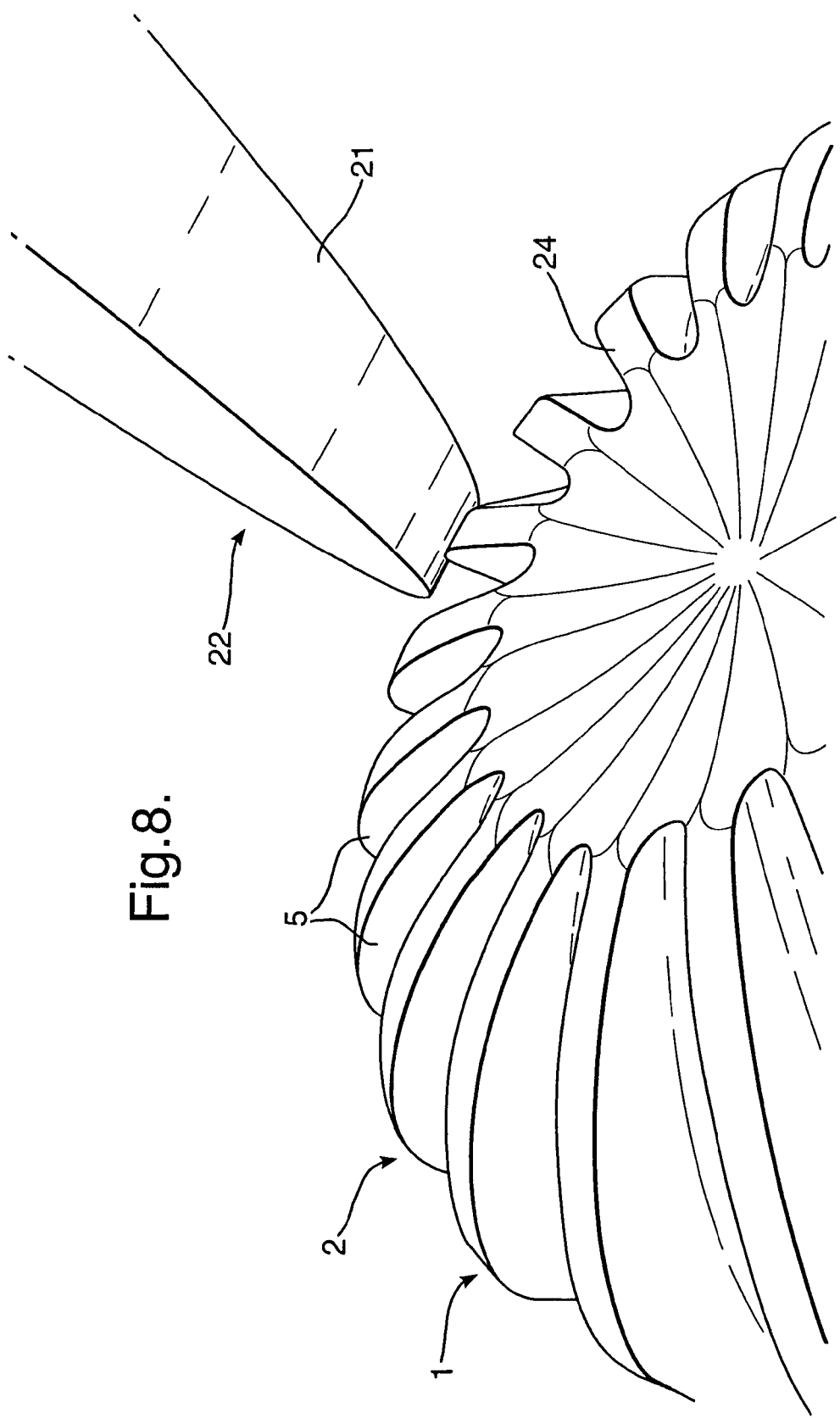
FIGS. 8, 9, 10 and 11 show progressively how the third grinding operation is effected to produce the radius.

A finished milling cutter 1 in accordance with a first embodiment is illustrated in FIGS. 6 and 7. The cutter 1 has a cutting head 2 and a coaxial integral shank 3 for securing in a chuck or arbour of a machine tool for rotation about an axis X.

The cutting head 2 has a plurality (e.g. thirty) of helical flutes 5 extending from a leading end 6 of the head 2, to a trailing end 7 of the head 2. Each flute 5 has a tooth 8 provided with a leading face 9 and a rear face 10, FIG. 1. The leading face 9 faces the direction of rotation of the cutter 1 when in use and has a cutting tip 4. The cutting tip 4 of each of the teeth 8 lie on the circumference of a pitch circle having a diameter D, FIG. 3. The leading face 9 has a positive radial rake angle $\varnothing°$. The radial rake angle $\varnothing$ is the angle that the inclined leading face 9 makes with a radial line Y, FIG. 2, extending from the tool axis X to the tip 4 of a tooth 8. The angle $\varnothing$ is up to approximately 1-2° in the preferred embodiment of the present invention, depending on the material being cut, and zero rake may be required for some materials.

Figure 2:
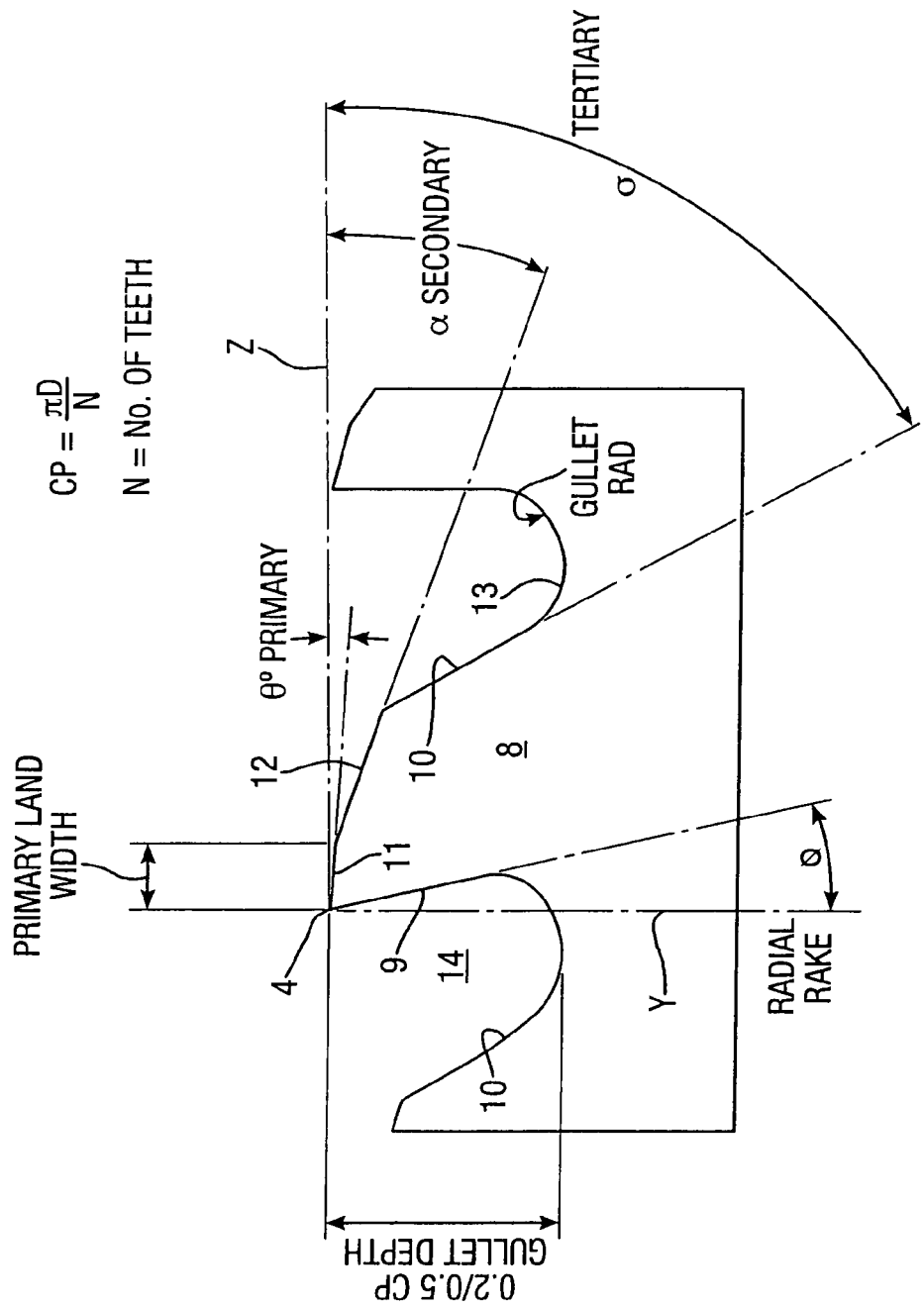
FIG. 2 is an enlarged view of one of the teeth shown in FIG. 1.

As shown in FIG. 2, each tooth 8 also has a primary relief rake facet 11 which, in the example illustrated, is planar. The primary facet 11 comprises a land which extends rearwardly from the tip of the leading edge 9 of the tooth 8. The primary facet 11 is inclined at an angle to a tangent Z extending from the pitch circle at the tooth tip 4. This angle is referred to as the primary clearance angle $\theta°$ and is of the order of approximately 5° to approximately 7°.

A secondary relief rake facet 12, also planar in the example illustrated, extends from the primary facet 11 to the rear face 10. The secondary facet 12 is inclined at a secondary clearance angle $\alpha$ to a tangent Z extending from the pitch circle at the tooth tip 4. The secondary clearance angle $\alpha$ is of the order of approximately 10° to approximately 15° in the preferred embodiment of the present invention.

Alternatively however the primary relief rake facet and/or the secondary relief rake facet is/are not planar but is/are eccentric or convex, providing more material, and hence greater strength for each tooth.

Each tooth 8 also has a tertiary clearance angle $\sigma$, shown in FIG. 2, which is the angle between the rear face 10 and the tangent Z extending from the pitch circle at the tooth tip 4.

The primary, secondary and tertiary clearance angles are used to define the geometry of the double ratchet tooth form. By controlling these angles the geometry of the tooth can be defined in the manufacturing process.

By controlling the radial rake angle $\varnothing$ and the primary, secondary and tertiary clearance angles a strong tooth is formed with a resultant wedge angle W, which can be optimised to suit materials which are notoriously difficult to cut.

Figure 1:
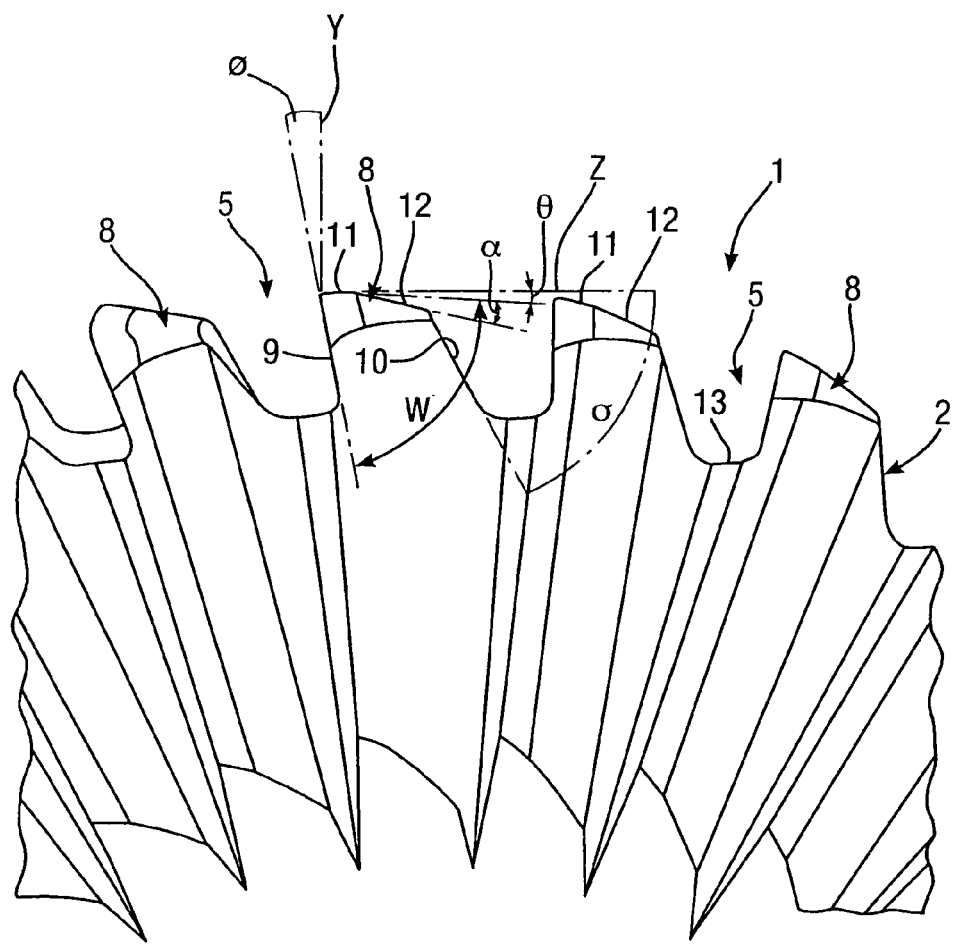
FIG. 1 shows a portion of a first embodiment of a milling cutter in accordance with the first and second aspects of the invention.

The wedge angle W is shown in FIG. 1 and is defined by the equation;

$$W = 90 - \varnothing - \theta.$$

Thus, each tooth 8 in the preferred embodiment of the present invention has a wedge angle W defined between its leading face 9 and the primary relief rake facet 11, of approximately 76°.

The leading face 9 of a trailing tooth 8, and a rear face 10 of the immediately preceding tooth 8 diverge and define, together with a flute base 13, a gullet 14. The gullet 14 is provided for swarf removal purposes and is designed so that in use the swarf generated during cutting is carried away without clogging the cutter. This is achieved by controlling the pitch of the teeth, the depth of the gullet 14 and the width of the land of the primary facet 11.

The distance between the teeth 8 is measured as an arc length CP along the circumference of the pitch circle. The arc length CP between teeth 8 is defined by the equation:

$$CP = \pi D/N$$

D is the diameter of the pitch circle and N is the number of teeth.

The width of the land is kept in the range 0.05CP-0.25CP and the depth of the gullet 14 is kept in the range 0.2CP-0.5CP, where $CP = \pi D/N$.

Figure 3:
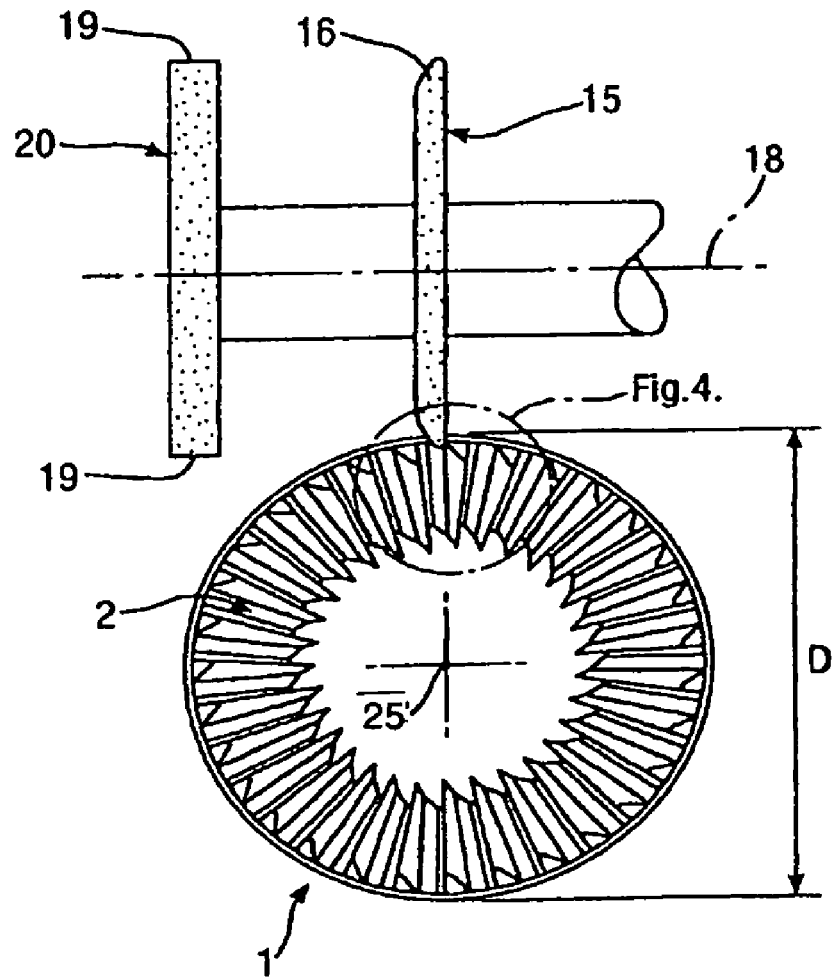
FIG. 3 shows the first grinding operation forming the flutes of the first embodiment.
Figure 4:
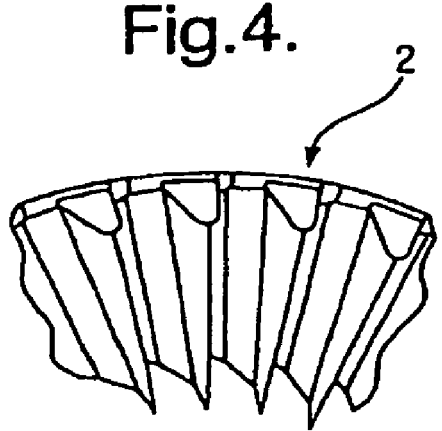
FIG. 4 is an enlargement of the ringed portion indicated in FIG. 3.

The method, in accordance with the first aspect of the invention, of manufacturing the cutter 1 in accordance with the second aspect is illustrated in FIGS. 2 to 4 and is basically a three-stage grinding operation using three grinding wheels of different peripheral profiles.

In the first grinding operation, a first grinding wheel 15 has a generally frusto-conical profile peripheral area 16 with an edge 17 of profile required for the flute base 13, and is rotated about an axis 18 extending generally transversely to axis 25 of the milling cutter 1. As best seen in FIG. 4, the periphery area 16 of the first grinding wheel 15 grinds individual flutes 5 into the outer periphery of a cutter blank from the leading end 6 towards the shank 3, specifically grinding:

(i) the positive rake angle on the leading face 9 (of a trailing tooth 8), simultaneously with (ii) a rear face 10 on an immediately preceding tooth 8, simultaneously with (iii) the base 13.

In the second grinding operation, a peripheral edge 19 of a second grinding wheel 20, of rectangular profile is also rotatable about axis 18 generally transversely of the milling cutter axis 25 and is used to grind firstly the primary relief rake facet 11 and then, after a change of grinding angle, the secondary relief rake facet 12 to produce a milling cutter 1 with a plurality of helical teeth 5 each having a double ratchet tooth form, in a two-stage grinding operation.

Figure 9:
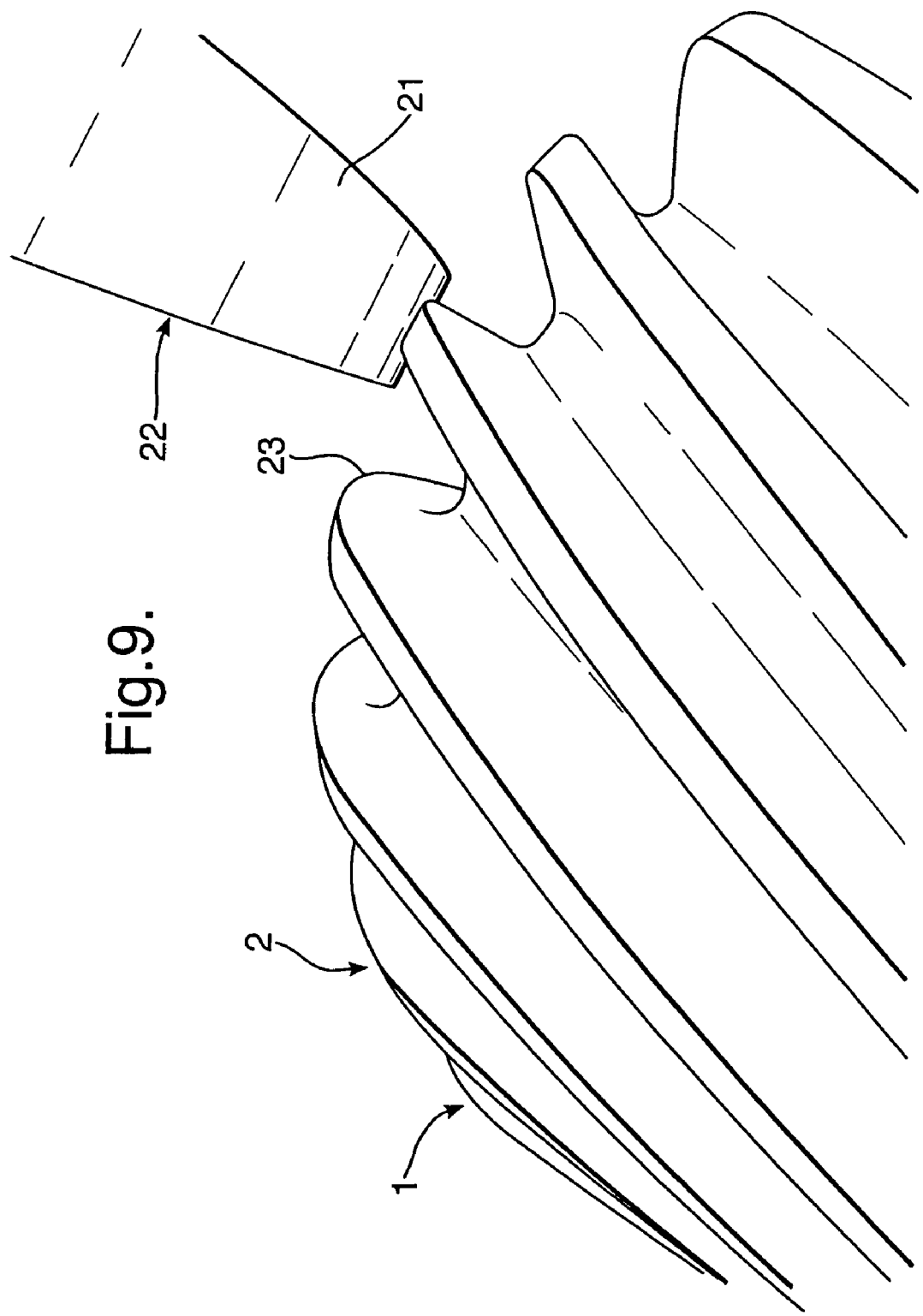
Figure 10:
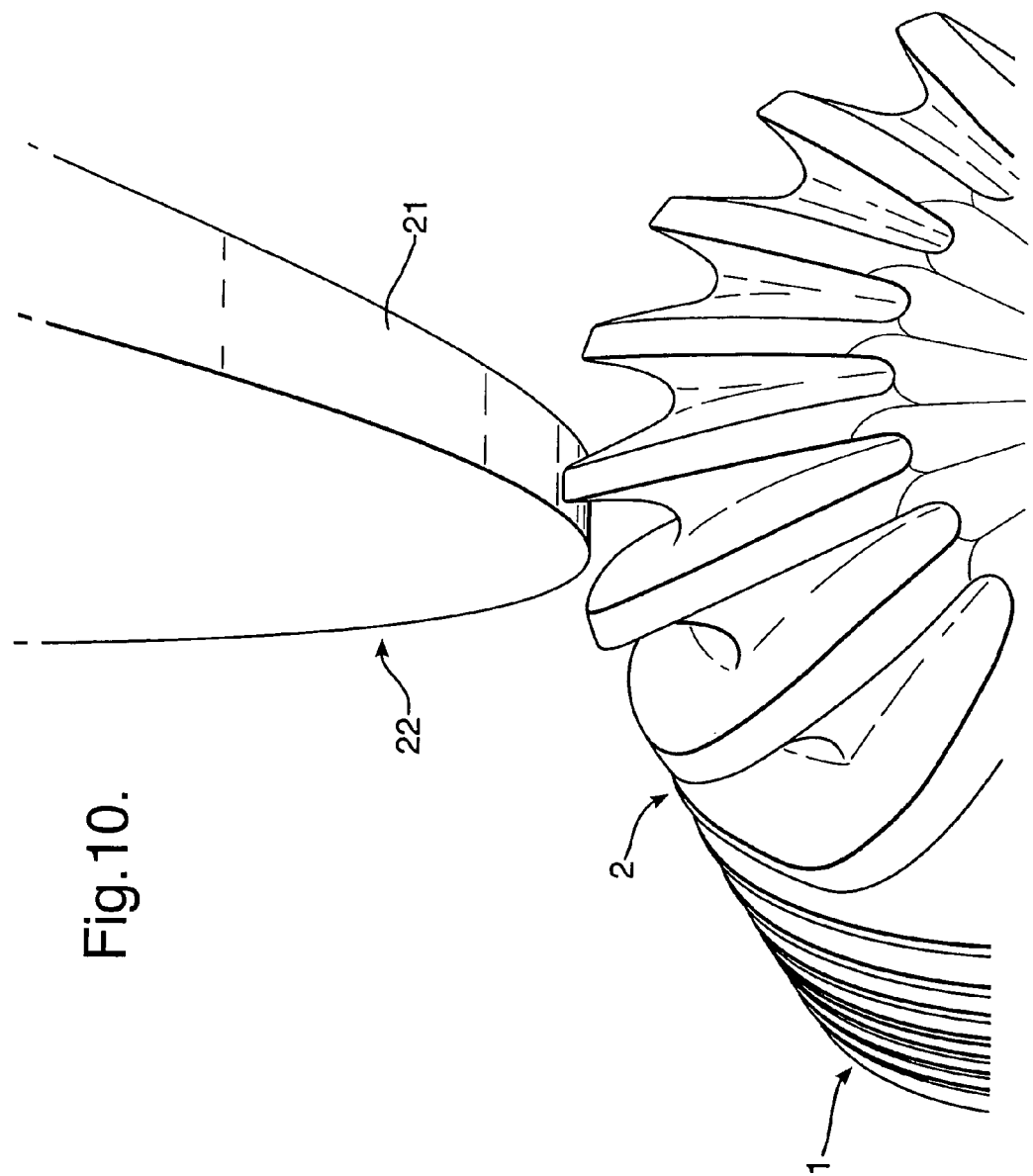
Figure 11:
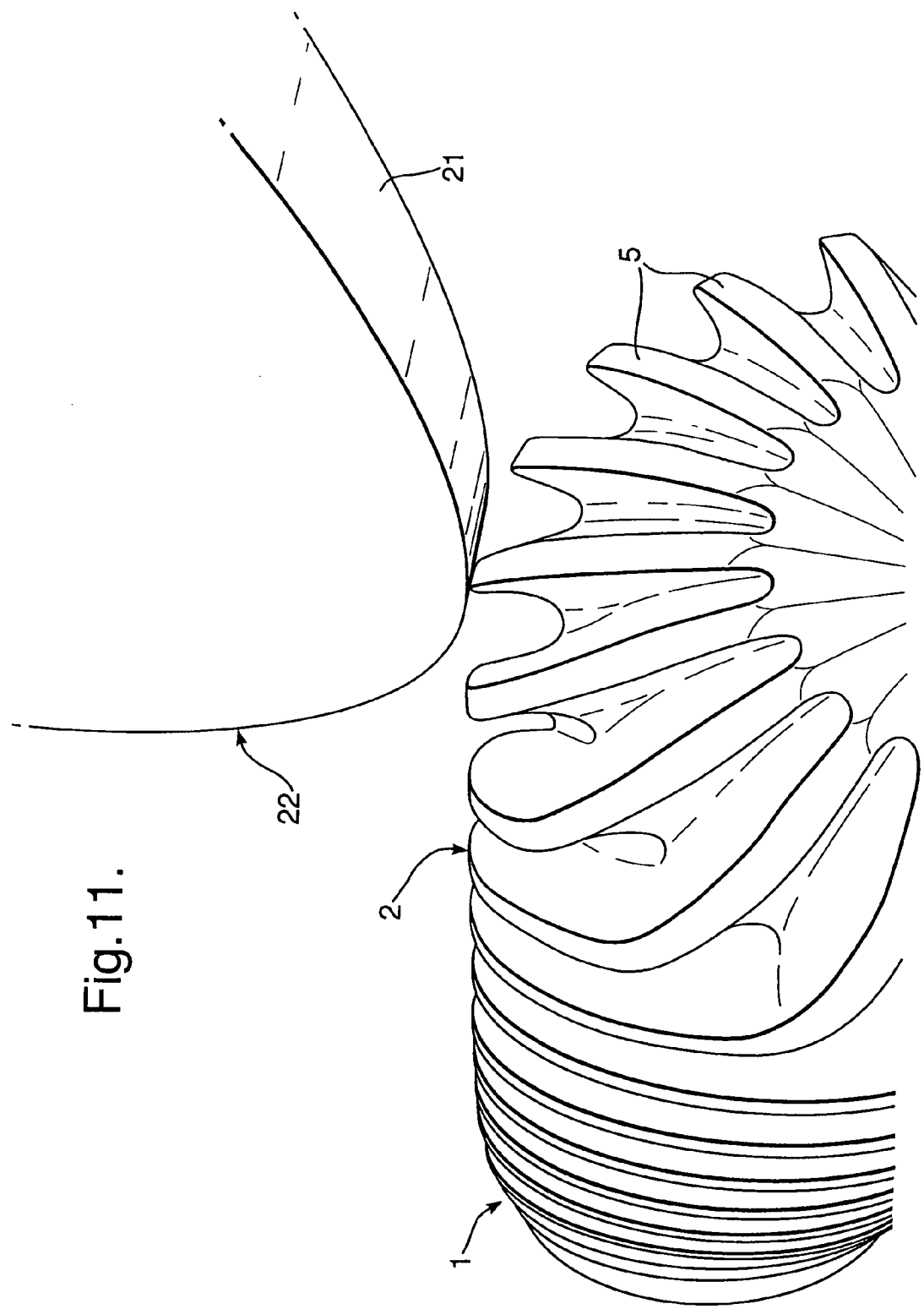

In the third grinding operation (see FIGS. 9 to 11), a peripheral edge 21 of a third grinding wheel 22 is used to grind a radius 23 onto the end of each tooth 5, this grinding operation commencing at the lead end 24 of each tooth 5 and advancing away from that end toward the shank 3 of the cutter 7.

Figure 2A:
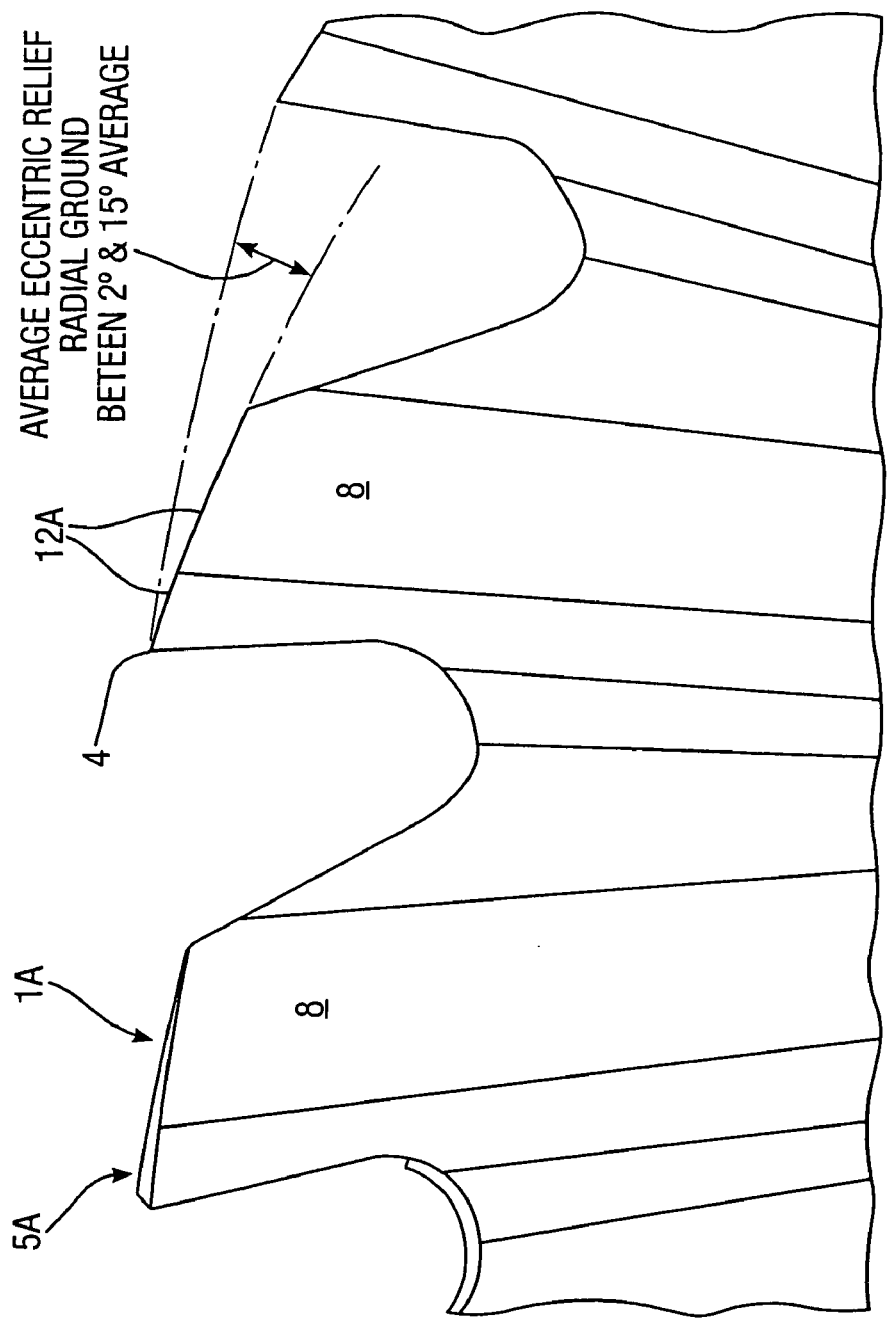
FIG. 2A corresponds to FIG. 2, but shows a second embodiment of the milling cutter.
Figure 4A:
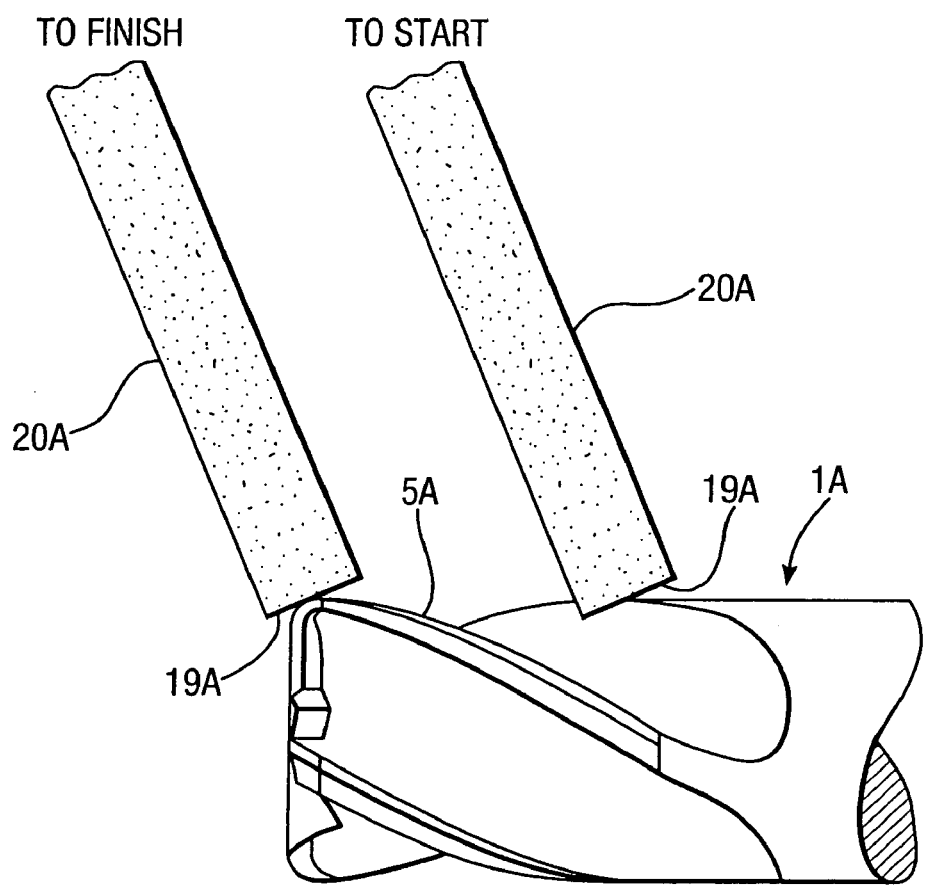
FIG. 4A shows the grinding of the eccentric relief face of the second embodiment.
Figure 5:
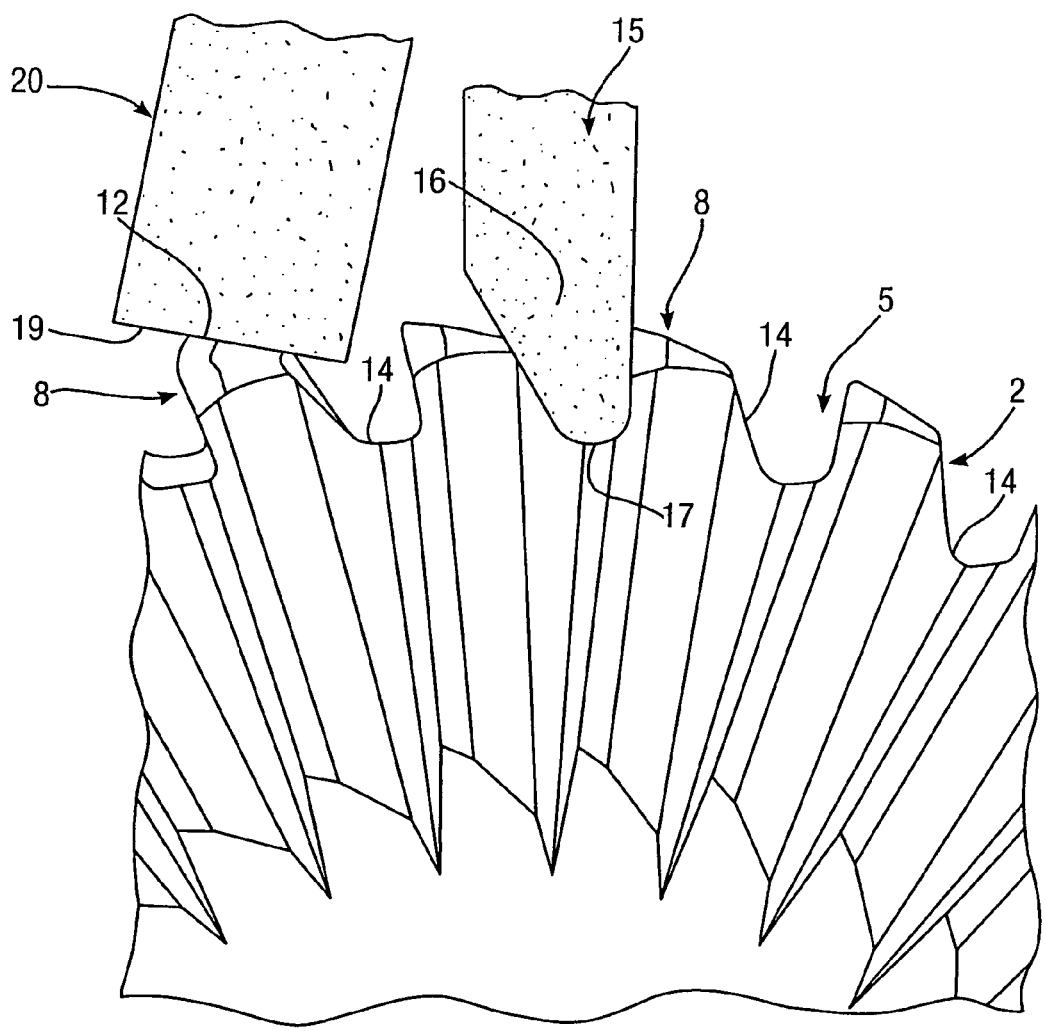
FIG. 5 is an enlargement of FIG. 3 showing how both the first and second grinding operations are effected.

The double ratchet tooth form embodiment of milling cutter results in a cutting tool having the required strength and durability. An alternative relief face 12A is illustrated in the second embodiment of milling cutter 1A, shown in FIG. 2A, where the primary and secondary planar relief faces 11 and 12 of the first embodiment (see FIG. 2) are replaced by a single eccentric or convex relief face 12A ground at an average eccentric relief between approximately 2° and approximately 15°. The manner of grinding eccentric relief face 12A is illustrated in FIG. 4A, using a peripheral edge 19A of a grinding wheel 20A and advancing from the rear of each flute 5A to the leading end of each flute 5A. Tests have shown that metal removal rates, for cutters in accordance with the present invention, are increased not marginally but by up to 20 times. This results in marked reduction not only of machining time but also of the number of machine tools required, providing further savings not only of capital costs but also of factory space. The cutters have the ability to carry away swarf and resist the degredating effects of heat when machining exotic materials. The swarf produced by a milling cutter design in accordance with the present invention is in the form of short, stubby chips as opposed to continuous spirals as produced by conventional cutting tools. The consistently short and stubby chips are also clean because cutting does not reach such high temperatures so as to cause significant oxidation. The regular chip size of the swarf makes them suitable for packing into cans and consolidating by hot isostatic pressing HIP. The fact that the chips are highly deformed by the machining process also means a fine-grained homogenous consolidated structure can be achieved using optimum HIP times and temperatures which promote high strength and tough mechanical properties. This offers the further advantage that the regular clean chips from a multi-flute cutter in accordance with the present invention can be recycled and consolidated into new components.

The invention claimed is:

1. A method of manufacturing a milling cutter having a cutting head and a coaxial integral shank for mounting in a chuck or arbour of a machine tool, the method comprising:
   (i) grinding, in a first grinding operation, a plurality of helical flutes into the outer periphery of a cutter blank from a lead end of the blank distal from the shank towards the shank, using a peripheral area of a first grinding wheel generally of frusto-conical profile and rotatable about an axis generally transversely of the milling cutter axis, which peripheral area produces, simultaneously, the following three features:
   a leading face of a trailing tooth;
   a rear face on an adjacent preceding tooth; and
   a swarf removal gullet, of profile corresponding to that of the peripheral area of the first grinding wheel, having divergent sides defined between the leading face of a trailing tooth and the rear face of an adjacent preceding tooth;
   (ii) grinding, in a second grinding operation, and using a peripheral edge of a second grinding wheel of rectangular profile, and rotatable about an axis generally transversely of the milling cutter axis, a relief face which extends rearwardly from a leading end of a tooth tip, resulting in a minimum tooth wedge angle of approximately 60° measured between the leading face of a tooth to the relief face of that tooth; and
   (iii) grinding, in a third grinding operation, and using a peripheral edge of a third grinding wheel, a radius on the end of each tooth by grinding along each tooth from the lead end of each tooth towards the shank of the cutter.

2. The method of claim 1, wherein the relief face produced by the secondary grinding operation, comprises a primary relief rake facet and a secondary relief rake facet, which extends from an end of the primary relief rake facet distal from the tooth tip.

3. The method of claim 2, wherein the primary and secondary facets are planar, the primary relief rake facet being ground at a first angle, and the secondary relief rake facet being ground at a second angle greater than the first.

4. The method of claim 1, wherein the relief face produced by the second grinding operation is of eccentric or convex profile.

5. A milling cutter comprising:
   a shank; and
   a cutting head attached to the shank, the cutting head having a plurality of <500 helical teeth, with a lead end of each tooth provided with a radius, the lead ends of the plurality of teeth defining a pitch circle,
   each tooth including a cutting tip, the plurality of cutting tips being equally spaced around the circumference of the pitch circle,
   with each tooth having a leading face and a relief face, each tooth having a minimum tooth wedge angle of approximately 60° measured between the leading face and the relief face.

6. The milling cutter of claim 5, wherein each tooth has a double ratchet tooth form comprising a primary relief rake facet and a contiguous secondary relief rake facet.

7. The milling cutter of claim 6, wherein the primary and secondary relief rake facets are planar, the primary relief rake facet being ground at a first angle, and the secondary relief rake facet being ground at a second angle greater than the first.

8. The milling cutter of claim 6, wherein the primary relief rake facet has a clearance angle of approximately 5° to 7°.

9. The milling cutter of claim 6, wherein the secondary relief rake facet has a clearance angle of approximately 10° to 15°.

10. The milling cutter of claim 5, wherein each tooth has a relief face of eccentric or convex profile.

11. The milling cutter of claim 5, wherein each tooth has a leading face with a positive radial rake.

12. The milling cutter of claim 5 having between 20 and 60 teeth.

13. The milling cutter of claim 5, wherein the wedge angle of each tooth is greater than approximately 60° but less than approximately 90°.

14. The milling cutter of claim 13, wherein each flute has a double ratchet tooth form comprising a primary relief rake facet and a contiguous secondary relief rake facet and the wedge angle of each tooth is 90° less the primary relief rake angle, and less the secondary relief rake angle.

15. The milling cutter of claim 5, wherein the wedge angle of each tooth is approximately 76°.

16. The milling cutter of claim 5, wherein the cutter is of 16 mm diameter with 8-20 teeth with a 1 mm radius on the lead end of each tooth.

17. A milling cutter comprising:
   a shank; and
   a cutting head attached to the shank, the cutting head having between 20 and 500 helical teeth at equal angles, with a lead end of each tooth provided with a radius, wherein each tooth has a double ratchet tooth form including a primary relief rake facet and a contiguous secondary relief rake facet, and each tooth has a leading face and has a minimum tooth wedge angle of approximately 60° measured between the leading face and the primary relief rake facet.

18. The milling cutter of claim 17, wherein the primary relief rake facet and the secondary relief rake facet are planar, the primary relief rake facet being ground at a first angle, and the secondary relief rake facet being ground at a second angle greater than the first.

19. The milling cutter of claim 17, wherein the primary relief rake facet has a clearance angle of approximately 5° to 7°.

20. The milling cutter of claim 17, wherein the secondary relief rake facet has a clearance angle of approximately 10° to 15°.

21. The milling cutter of claim 5, the pitch circle having a diameter D, and the cutting head having N helical teeth, wherein a spacing between any two adjacent cutting tips is defined as $(\pi D)/N$.

* * * * *